US009621062B2

(12) United States Patent
Melanson (10) Patent No.: US 9,621,062 B2
(45) Date of Patent: *Apr. 11, 2017

(54) DIMMER OUTPUT EMULATION WITH NON-ZERO GLUE VOLTAGE

(71) Applicant: KONINKLIJKE PHILIPS N.V., Eindhoven (NL)

(72) Inventor: John L. Melanson, Austin, TX (US)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 175 days.

This patent is subject to a terminal disclaimer.

(21) Appl. No.: 14/200,400

(22) Filed: Mar. 7, 2014

(65) Prior Publication Data

US 2015/0256091 A1    Sep. 10, 2015

(51) Int. Cl.
*H05B 33/08* (2006.01)
*H02M 5/293* (2006.01)
(Continued)

(52) U.S. Cl.
CPC ............. *H02M 5/293* (2013.01); *H02M 1/08* (2013.01); *H02M 7/066* (2013.01);
(Continued)

(58) Field of Classification Search
None
See application file for complete search history.

(56) References Cited

U.S. PATENT DOCUMENTS 4,523,128 A    6/1985    Stamm et al.
5,055,746 A    10/1991    Hu et al.
(Continued)

FOREIGN PATENT DOCUMENTS

CN    101637064 A    1/2010
CN    101505568 A    10/2012
(Continued)

OTHER PUBLICATIONS

Amanci, et al, "Synchronization System with Zero-Crossing Peak Detection Algorithm for Power System Applications", The 2010 International Power Electronics Conference, pp. 2984-2991, Toronto, Ontario, Canada.
(Continued)

*Primary Examiner* — Dedei K Hammond (57) ABSTRACT

An apparatus may include a dimmer output voltage emulator for causing a power converter interface circuit to draw current from a capacitor in the power converter interface during a period of time when a dimmer coupled to the power converter interface circuit is non-conducting to generate an emulated dimmer output voltage. The emulated dimmer output voltage may emulate part of a cycle of a non-zero AC dimmer output voltage of the dimmer after a triac of the dimmer prematurely stops conducting that would occur if the triac continued conducting during the part of the cycle. The dimmer output voltage emulator may include a pull-down circuit to pull down current of the interface circuit and generally decrease the emulated dimmer output voltage during a first period of time and a hold circuit to maintain the emulated dimmer output voltage below a substantially non-zero threshold value during a second period of time.

20 Claims, 6 Drawing Sheets

(51) Int. Cl.
  *H02M 7/06* (2006.01)
  *H02M 1/08* (2006.01)
  *H05B 37/02* (2006.01)
  *H05B 39/04* (2006.01)

(52) U.S. Cl.
  CPC ..... *H05B 33/0815* (2013.01); *H05B 33/0845* (2013.01); *H05B 37/02* (2013.01); *H05B 37/0209* (2013.01); *H05B 39/044* (2013.01)

(56) References Cited

U.S. PATENT DOCUMENTS

| | | |
|---|---|---|
| 5,179,324 A | 1/1993 | Audbert |
| 5,319,301 A | 6/1994 | Callahan et al. |
| 5,321,350 A | 6/1994 | Haas |
| 5,430,635 A | 7/1995 | Liu |
| 5,691,605 A | 11/1997 | Xia et al. |
| 5,770,928 A | 6/1998 | Chansky et al. |
| 6,043,635 A | 3/2000 | Downey |
| 6,046,550 A | 4/2000 | Ference et al. |
| 6,091,205 A | 7/2000 | Newman et al. |
| 6,211,624 B1 | 4/2001 | Holzer |
| 6,380,692 B1 | 4/2002 | Newman et al. |
| 6,407,514 B1 | 6/2002 | Glaser et al. |
| 6,510,995 B2 | 1/2003 | Muthu |
| 6,621,256 B2 | 9/2003 | Muratov et al. |
| 6,713,974 B2 | 3/2004 | Patchornik et al. |
| 6,714,425 B2 | 3/2004 | Yamada et al. |
| 6,858,995 B2 | 2/2005 | Lee et al. |
| 6,900,599 B2 | 5/2005 | Ribarich |
| 7,102,902 B1 | 9/2006 | Brown et al. |
| 7,180,250 B1 | 2/2007 | Gannon |
| 7,184,937 B1 | 2/2007 | Su et al. |
| 7,339,329 B2 | 3/2008 | Makimura et al. |
| 7,656,103 B2 | 2/2010 | Shteynberg et al. |
| 7,719,246 B2 | 5/2010 | Melanson |
| 7,728,530 B2 | 6/2010 | Wang et al. |
| 7,733,678 B1 | 6/2010 | Notohamiprodjo et al. |
| 7,759,881 B1 | 7/2010 | Melanson |
| 7,786,711 B2 | 8/2010 | Wei et al. |
| 7,872,427 B2 | 1/2011 | Scianna |
| 8,102,167 B2 | 1/2012 | Irissou et al. |
| 8,115,419 B2 | 2/2012 | Given et al. |
| 8,169,154 B2 | 5/2012 | Thompson et al. |
| 8,212,491 B2 | 7/2012 | Kost et al. |
| 8,212,492 B2 | 7/2012 | Lam et al. |
| 8,222,832 B2 | 7/2012 | Zheng et al. |
| 8,482,220 B2 | 7/2013 | Melanson |
| 8,487,546 B2 | 7/2013 | Melanson |
| 8,508,147 B2 | 8/2013 | Shen |
| 8,536,794 B2 | 9/2013 | Melanson et al. |
| 8,536,799 B1 | 9/2013 | Grisamore et al. |
| 8,547,034 B2 | 10/2013 | Melanson et al. |
| 8,569,972 B2 * | 10/2013 | Melanson ......... H05B 33/0815 315/247 |
| 8,581,518 B2 | 11/2013 | Kuang et al. |
| 8,610,364 B2 | 12/2013 | Melanson et al. |
| 8,610,365 B2 | 12/2013 | King et al. |
| 8,664,885 B2 | 3/2014 | Koolen et al. |
| 8,716,957 B2 | 5/2014 | Melanson et al. |
| 8,749,173 B1 | 6/2014 | Melanson et al. |
| 8,829,819 B1 | 9/2014 | Angeles |
| 8,847,515 B2 | 9/2014 | King et al. |
| 2002/0140371 A1 | 10/2002 | Chou et al. |
| 2004/0105283 A1 | 6/2004 | Schie et al. |
| 2004/0212321 A1 | 10/2004 | Lys |
| 2006/0022648 A1 | 2/2006 | Ben-Yaakov et al. |
| 2006/0208669 A1 | 9/2006 | Huynh et al. |
| 2007/0081611 A1 | 4/2007 | Fudge |
| 2007/0182338 A1 | 8/2007 | Shteynberg et al. |
| 2007/0182347 A1 | 8/2007 | Shteynberg |
| 2008/0018261 A1 | 1/2008 | Kastner |
| 2008/0101098 A1 | 5/2008 | Disney |
| 2008/0143266 A1 | 6/2008 | Langer |
| 2008/0192509 A1 | 8/2008 | Dhuyvetter et al. |
| 2008/0205103 A1 | 8/2008 | Sutardja et al. |
| 2008/0224629 A1 | 9/2008 | Melanson |
| 2008/0224633 A1 | 9/2008 | Melanson |
| 2008/0224636 A1 | 9/2008 | Melanson |
| 2008/0225168 A1 | 9/2008 | Ouslis |
| 2009/0044087 A1 | 2/2009 | Chen |
| 2009/0134817 A1 | 5/2009 | Jurngwirth et al. |
| 2009/0135632 A1 | 5/2009 | Sohma |
| 2009/0195186 A1 | 8/2009 | Guest et al. |
| 2009/0284182 A1 | 11/2009 | Cencur |
| 2010/0002480 A1 | 1/2010 | Huynh et al. |
| 2010/0013405 A1 | 1/2010 | Thompson et al. |
| 2010/0013409 A1 | 1/2010 | Quek et al. |
| 2010/0066328 A1 | 3/2010 | Shimizu et al. |
| 2010/0164406 A1 | 7/2010 | Kost et al. |
| 2010/0213859 A1 | 8/2010 | Shteynberg et al. |
| 2010/0231136 A1 | 9/2010 | Reisenauer et al. |
| 2010/0244726 A1 | 9/2010 | Melanson |
| 2011/0032720 A1 * | 2/2011 | Chen ................. B60Q 1/076 362/516 |
| 2011/0043133 A1 | 2/2011 | Van Laanen et al. |
| 2011/0080110 A1 | 4/2011 | Nuhfer et al. |
| 2011/0084622 A1 | 4/2011 | Barrow et al. |
| 2011/0084623 A1 | 4/2011 | Barrow |
| 2011/0115395 A1 | 5/2011 | Barrow et al. |
| 2011/0121754 A1 | 5/2011 | Shteynberg |
| 2011/0148318 A1 | 6/2011 | Shackle et al. |
| 2011/0204797 A1 | 8/2011 | Lin et al. |
| 2011/0204803 A1 | 8/2011 | Grotkowski et al. |
| 2011/0234115 A1 | 9/2011 | Shimizu et al. |
| 2011/0266968 A1 | 11/2011 | Bordin et al. |
| 2011/0291583 A1 | 12/2011 | Shen |
| 2011/0309759 A1 | 12/2011 | Shteynberg et al. |
| 2012/0025724 A1 | 2/2012 | Melanson et al. |
| 2012/0043913 A1 * | 2/2012 | Melanson ......... H05B 33/0815 315/307 |
| 2012/0049752 A1 | 3/2012 | King et al. |
| 2012/0068626 A1 | 3/2012 | Lekatsas et al. |
| 2012/0098454 A1 | 4/2012 | Grotkowski et al. |
| 2012/0112651 A1 | 5/2012 | King et al. |
| 2012/0133291 A1 | 5/2012 | Kitagawa et al. |
| 2012/0286686 A1 | 11/2012 | Watanabe et al. |
| 2013/0015768 A1 | 1/2013 | Roberts et al. |
| 2013/0049621 A1 | 2/2013 | Yan |
| 2013/0083424 A1 | 4/2013 | Iwashiro |
| 2013/0154495 A1 * | 6/2013 | He ................. H02M 1/44 315/210 |
| 2013/0342123 A1 | 12/2013 | Melanson et al. |
| 2014/0009082 A1 | 1/2014 | King et al. |
| 2014/0028214 A1 | 1/2014 | Mazumdar et al. |

FOREIGN PATENT DOCUMENTS

| | | |
|---|---|---|
| EP | 1164819 A1 | 12/2001 |
| EP | 2257124 A1 | 1/2010 |
| EP | 2232949 B1 | 9/2010 |
| JP | 2008053181 A | 3/2008 |
| JP | 2009170240 A | 7/2009 |
| WO | 9917591 A1 | 4/1999 |
| WO | 02096162 A1 | 11/2002 |
| WO | 2006079937 A1 | 8/2006 |
| WO | 2008029108 A1 | 3/2008 |
| WO | 2008112822 A2 | 9/2008 |
| WO | 2010011971 A1 | 1/2010 |
| WO | 2010027493 A2 | 3/2010 |
| WO | 2010035155 A2 | 4/2010 |
| WO | 2011008635 A1 | 1/2011 |
| WO | 2011050453 A1 | 5/2011 |
| WO | 2011056068 A2 | 5/2011 |
| WO | 2012016197 A1 | 2/2012 |

OTHER PUBLICATIONS

Azoteq, IQS17 Family, IQ Switch—ProxSense Series, IQS17 Datasheet V2.00.doc, Jan. 2007, pp. 1-51.
Chan et al, Design and Implementation of Dimmable Electronic Ballast Based on Integrated Inductor, IEEE Transactions on Power Electronics, vol. 22, No. 1, Jan. 2007, pp. 291-300.

(56) References Cited

OTHER PUBLICATIONS

Gonthier et al, EN55015 Compliant 500W Dimmer with Low-Losses Symmetrical Switches, EPE 2005—Dresden, 9 pages.
Green, A ballast that can be dimmed from a domestic (phase cut) dimmer, International Rectifier, El Segundo, CA, IRPLCFL3 rev.b, Aug. 25, 2003, 12 pages.
Hausman, Real-Time Illumination Stability Systems for Trailing-Edge (Reverse Phase Control) Dimmers, Technical white paper, Dec. 2004, version 1.0, Lutron Electronics Co. Inc., Coopersburg, PA.
Lee et al, A Novel Electrode Power Profiler for Dimmable Ballasts Using DC Link Voltage and Switching Frequency Controls, IEEE Transactions on Power Electronics, vol. 19, No. 3, May 2004, pp. 847-853.
Light Dimmer Circuits, www.epanorama.net, 9 pages.
Lutron, Flourescent dimming systems technical guide, Lutron Electronics Co., Inc., Coopersburg, PA, 2002, 28 pages.
Lutron, Why Different Dimming Ranges? The Difference Between Measured and Perceived Light, 1 page.
O'Rourke, "Dimming Electronic Ballasts," National Lighting Product Information Program, Specifier Reports,vol. 7, No. 3, Oct. 1999, pp. 1-24.
Patterson, James, "Efficient Method for Interfacing TRIAC Dimmers and LEDs", National Semiconductor Corp., EDN, pp. 29-32, Jun. 23, 2011, USA.
Rand et al: "Issues, Models and Solutions for Triac Modulated Phase Dimming of LED Lamps" Power Electronics Specialists Conference, 2007, PESC 2007, IEEE, IEEE, P1, Jun. 1, 2007, pp. 1398-1404.
Supertex Inc, 56W Off-line LED Driver, 120VAC with PFC, 160V, 350mA Load, Dimmer Switch Compatible, Supertex, Inc., Sunnyvale CA, pp. 1-20.
Vainio, Olli, "Digital Filtering for Robust 50/60 Hz Zero-Crossing Detectors", IEEE Transactions on Instrumentation and Measurement, vol. 45, No. 2, Apr. 1996, pp. 426-430.
Wu et al, Single-Stage Electronic Ballast with Dimming Feature and Unity Power Factor, IEEE Transactions on Power Electronics, vol. 13, No. 3, May 1998, pp. 586-597.
International Search Report and Written Opinion, International Patent App. No. PCT/US2015/017109, mailed Jul. 1, 2015, 10 pages.
Supertex, Inc., HV9931 Unity Power Factor LED Lamp Drive, pp. 1-7, 2005, Sunnyvale, CA, US.

* cited by examiner

DIMMER OUTPUT EMULATION WITH NON-ZERO GLUE VOLTAGE

FIELD OF DISCLOSURE

The present disclosure relates in general to the field of electronics, and more specifically to methods and systems for dimmer output emulation.

BACKGROUND

Many electronic systems include circuits, such as switching power converters or transformers that interface with a dimmer. The interfacing circuits deliver power to a load in accordance with the dimming level set by the dimmer. For example, in a lighting system, dimmers provide an input signal to a lighting system. The input signal represents a dimming level that causes the lighting system to adjust power delivered to a lamp, and, thus, depending on the dimming level, increase or decrease the brightness of the lamp. Many different types of dimmers exist. In general, dimmers generate an output signal in which a portion of an alternating current ("AC") input signal is removed or zeroed out. For example, some analog-based dimmers utilize a triode for alternating current ("triac") device to modulate a phase angle of each cycle of an alternating current supply voltage. This modulation of the phase angle of the supply voltage is also commonly referred to as "phase cutting" the supply voltage. Phase cutting the supply voltage reduces the average power supplied to a load, such as a lighting system, and thereby controls the energy provided to the load.

A particular type of a triac-based, phase-cutting dimmer is known as a leading-edge dimmer. A leading-edge dimmer phase cuts from the beginning of an AC cycle, such that during the phase-cut angle, the dimmer is "off" and supplies no output voltage to its load, and then turns "on" after the phase-cut angle and passes phase cut input signal to its load. To ensure proper operation, the load must provide to the leading-edge dimmer a load current sufficient to maintain an inrush current above a current necessary for opening the triac. Due to the increase in voltage provided by the dimmer and the presence of capacitors in the dimmer, the current that must be provided is typically substantially higher than the steady state current necessary for triac conduction. Additionally, in steady state operation, the load must draw enough load current for the dimmer current to remain above another threshold known as a "hold current" needed to prevent premature disconnection of the triac.

Figure 1:
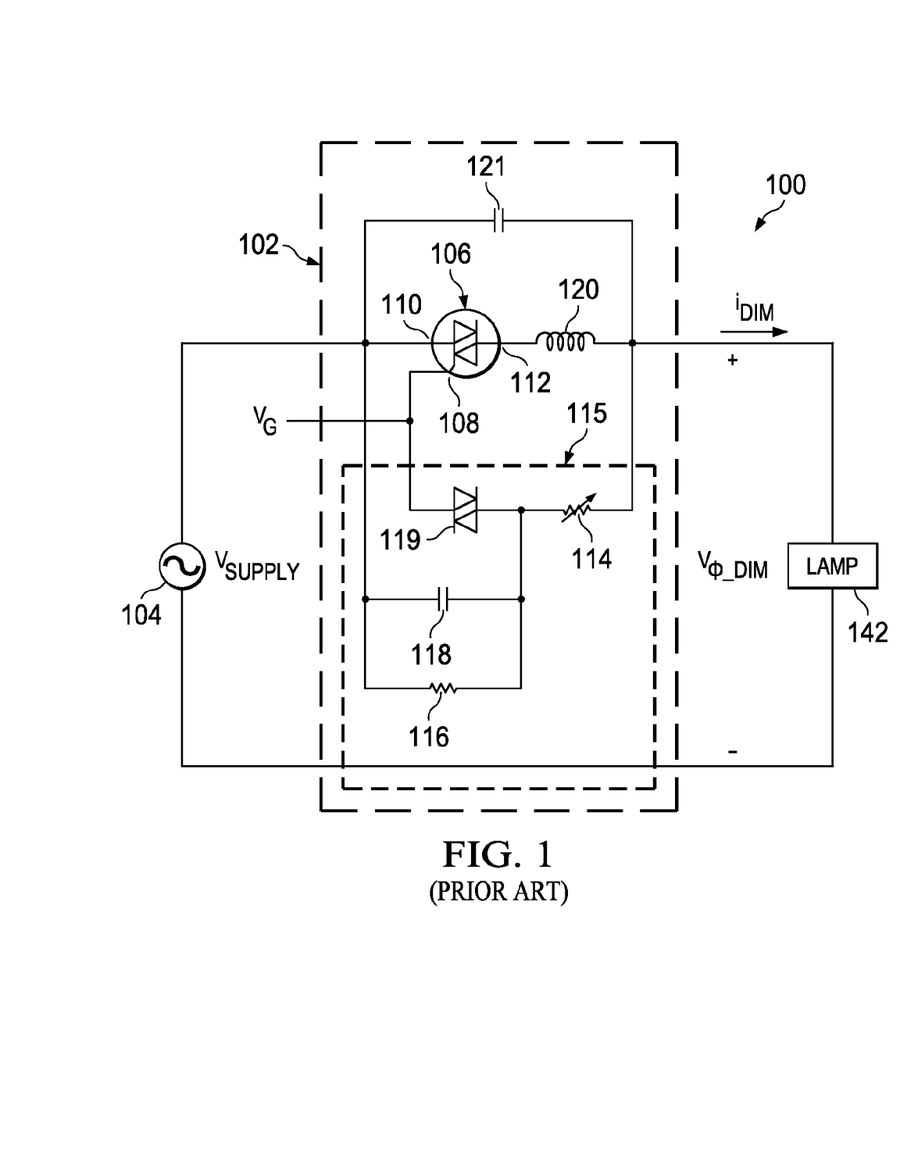
FIG. 1 illustrates a lighting system that includes a triac-based leading-edge dimmer, as is known in the art.
Figure 2:
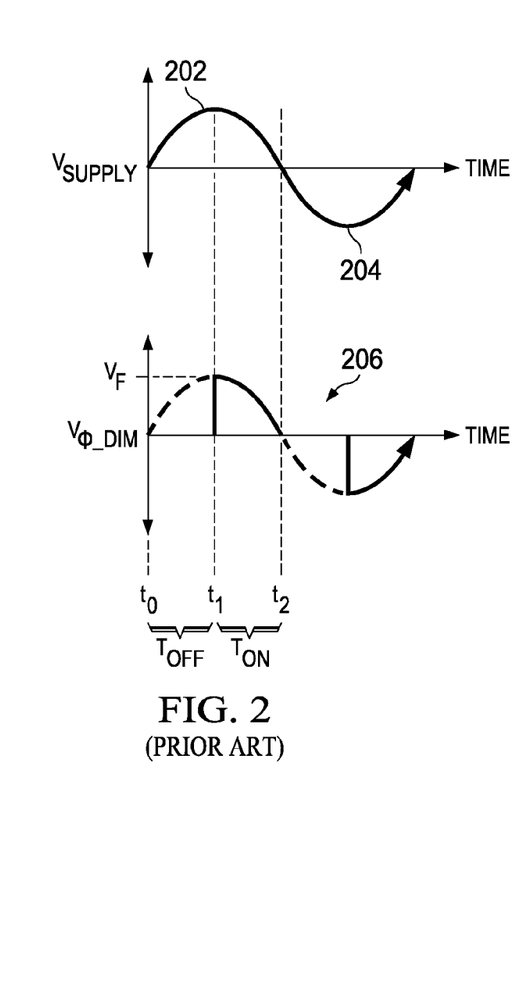
FIG. 2 illustrates example voltage and current graphs associated with the lighting system depicted in FIG. 1, as is known in the art.

FIG. 1 depicts a lighting system 100 that includes a triac-based leading-edge dimmer 102 and a lamp 142. FIG. 2 depicts example voltage and current graphs associated with lighting system 100. Referring to FIGS. 1 and 2, lighting system 100 receives an AC supply voltage $V_{SUPPLY}$ from voltage supply 104. The supply voltage $V_{SUPPLY}$ is, for example, a nominally 60 Hz/110 V line voltage in the United States of America or a nominally 50 Hz/220 V line voltage in Europe. Triac 106 acts as a voltage-driven switch, and a gate terminal 108 of triac 106 controls current flow between the first terminal 110 and the second terminal 112. A gate voltage $V_G$ on the gate terminal 108 above a firing threshold voltage value $V_F$ will cause triac 106 to turn ON, in turn causing a short of capacitor 121 and allowing current to flow through triac 106 and dimmer 102 to generate an output current $i_{DIM}$.

Assuming a resistive load for lamp 142, the dimmer output voltage $V_{\Phi\_DIM}$, represented by waveform 206, is zero volts from the beginning of each of half cycles 202 and 204 at respective times $t_0$ and $t_2$ until the gate voltage $V_G$ reaches the firing threshold voltage value $V_F$. Dimmer output voltage $V_{\Phi\_DIM}$ represents the output voltage of dimmer 102. During timer period $t_{OFF}$, the dimmer 102 chops or cuts the supply voltage $V_{SUPPLY}$ so that the dimmer output voltage $V_{\Phi\_DIM}$ remains at zero volts during time period $t_{OFF}$. At time $t_1$, the gate voltage $V_G$ reaches the firing threshold value $V_F$, and triac 106 begins conducting. Once triac 106 turns ON, the dimmer voltage $V_{\Phi\_DIM}$ tracks the supply voltage $V_{SUPPLY}$ during time period $t_{ON}$.

Once triac 106 turns ON, the current $i_{DIM}$ drawn from triac 106 must exceed an attach current $i_{ATT}$ in order to sustain the inrush current through triac 106 above a threshold current necessary for opening triac 106. In addition, once triac 106 turns ON, triac 106 continues to conduct current $i_{DIM}$ regardless of the value of the gate voltage $V_G$ as long as the current $i_{DIM}$ remains above a holding current value $i_{HC}$. The attach current value $i_{ATT}$ and the holding current value $i_{TTC}$ are functions of the physical characteristics of the triac 106. Once the current $i_{DIM}$ drops below the holding current value $i_{HC}$, i.e. $i_{DIM} < i_{HC}$, triac 106 turns OFF (i.e., stops conducting), until the gate voltage $V_G$ again reaches the firing threshold value $V_F$. In many traditional applications, the holding current value $i_{HC}$ is generally low enough so that, ideally, the current $i_{DIM}$ drops below the holding current value $i_{HC}$ when the supply voltage $V_{SUPPLY}$ is approximately zero volts near the end of the half cycle 202 at time $t_2$.

The variable resistor 114 in series with the parallel connected resistor 116 and capacitor 118 form a timing circuit 115 to control the time $t_1$ at which the gate voltage $V_G$ reaches the firing threshold value $V_F$. Increasing the resistance of variable resistor 114 increases the time $t_{OFF}$, and decreasing the resistance of variable resistor 114 decreases the time $t_{OFF}$. The resistance value of the variable resistor 114 effectively sets a dimming value for lamp 142. Diac 119 provides current flow into the gate terminal 108 of triac 106. The dimmer 102 also includes an inductor choke 120 to smooth the dimmer output voltage $V_{\Phi\_DIM}$. As known in the art, an inductor choke is a passive two-terminal electronic component (e.g., an inductor) which is designed specifically for blocking higher-frequency alternating current (AC) in an electrical circuit, while allowing lower frequency or direct current to pass. Triac-based dimmer 102 also includes a capacitor 121 connected across triac 106 and inductor choke 120 to reduce electro-magnetic interference.

Ideally, modulating the phase angle of the dimmer output voltage $V_{\Phi\_DIM}$ effectively turns the lamp 142 OFF during time period $t_{OFF}$ and ON during time period $t_{ON}$ for each half cycle of the supply voltage $V_{SUPPLY}$. Thus, ideally, the dimmer 102 effectively controls the average energy supplied to lamp 142 in accordance with the dimmer output voltage $V_{\Phi\_DIM}$.

The triac-based dimmer 102 adequately functions in many circumstances, such as when lamp 142 consumes a relatively high amount of power, such as an incandescent light bulb. However, in circumstances in which dimmer 102 is loaded with a lower-power load (e.g., a light-emitting diode or LED lamp), such load may draw a small amount of current $i_{DIM}$, and it is possible that the current $i_{DIM}$ may fail to reach the attach current $i_{ATT}$ and also possible that current $i_{DIM}$ may prematurely drop below the holding current value $i_{HC}$ before the supply voltage $V_{SUPPLY}$ reaches approximately zero volts. If the current $i_{DIM}$ fails to reach the attach current $i_{ATT}$, dimmer 102 may prematurely disconnect and may not pass the appropriate portion of input voltage $V_{SUPPLY}$ to its output. If the current $i_{DIM}$ prematurely drops below the holding current value $i_{HC}$, the dimmer 102 prematurely shuts down, and the dimmer voltage $V_{\Phi\_DIM}$ will prematurely drop to zero. When the dimmer voltage $V_{\Phi\_DIM}$ prematurely drops to zero, the dimmer voltage $V_{\Phi\_DIM}$ does not reflect the intended dimming value as set by the resistance value of variable resistor 114. For example, when the current $i_{DIM}$ drops below the holding current value $i_{HC}$ at a time significantly earlier than time $t_2$ for the dimmer voltage $V_{\Phi\_DIM}$ 206, the ON time period $t_{ON}$ prematurely ends at a time earlier than time $t_2$ instead of ending at time $t_2$, thereby decreasing the amount of energy delivered to the load. Thus, the energy delivered to the load will not match the dimming level corresponding to the dimmer voltage $V_{\Phi\_Dim}$. In addition, when voltage $V_{\Phi\_DIM}$ prematurely drops to zero, charge may accumulate on capacitor 118 and gate 108, causing triac 106 to again refire if gate voltage $V_G$ exceeds firing threshold value $V_F$ during the same half cycle 202 or 204, and/or causing triac 106 to fire incorrectly in subsequent half cycles due to such accumulated charge. Thus, premature disconnection of triac 106 may lead to errors in the timing circuitry of dimmer 102 and instability in its operation.

Dimming a light source with dimmers saves energy when operating a light source and also allows a user to adjust the intensity of the light source to a desired level. However, conventional dimmers, such as triac-based leading-edge dimmers and trailing-edge dimmers, that are designed for use with resistive loads, such as incandescent light bulbs, often do not perform well when attempting to supply a raw, phase modulated signal to a reactive load such as an electronic power converter or transformer.

Among the solutions to these problems include various approaches whereby control circuitry of a lighting system emulates an output voltage of a dimmer in order to provide compatibility between a low-power lamp and the power infrastructure to which it is coupled. However, in many such approaches which employ dimmer output emulation, the low-power lamp may present a low impedance during the phase cut period of the dimmer, which may lead to a small average direct current in the low-power lamp with some dimmers, which may cause flicker, may cause other elements of a lighting system (e.g., a transformer) to overheat, or may cause other undesirable effects, especially when many low-power lamps are coupled to the dimmer.

SUMMARY

In accordance with the teachings of the present disclosure, certain disadvantages and problems associated with ensuring compatibility of a low-power lamp with a legacy power infrastructure may be reduced or eliminated.

In accordance with embodiments of the present disclosure, an apparatus may include a dimmer output voltage emulator configured to cause a power converter interface circuit to draw current from a capacitor in the power converter interface during a period of time when a dimmer coupled to the power converter interface circuit is non-conducting to generate an emulated dimmer output voltage. The emulated dimmer output voltage may emulate part of a cycle of a non-zero alternating current dimmer output voltage of the dimmer after a triac of the dimmer prematurely stops conducting that would occur if the triac continued conducting during the part of the cycle. The dimmer output voltage emulator may include a pull-down circuit to pull-down current of the power converter interface circuit and generally decrease the emulated dimmer output voltage during a first period of time and a hold circuit to maintain the emulated dimmer output voltage below a substantially non-zero threshold value during a second period of time.

In accordance with these and other embodiments of the present disclosure, a method may include causing a power converter interface circuit to draw current from a capacitor in the power converter interface during a period of time when a dimmer coupled to the power converter interface circuit is non-conducting to generate an emulated dimmer output voltage. Generating the emulated dimmer output voltage may include emulating part of a cycle of a non-zero alternating current dimmer output voltage of the dimmer after a triac of the dimmer prematurely stops conducting that would occur if the triac continued conducting during the part of the cycle and pulling down current of the power converter interface circuit and generally decreasing the emulated dimmer output voltage during a first period of time and maintaining the emulated dimmer output voltage below a substantially non-zero threshold value during a second period of time.

In accordance with these and other embodiments of the present disclosure, an apparatus may include a power converter interface circuit configured to couple to a dimmer, a dimmer output voltage emulator, a power converter, and a controller. The dimmer output voltage emulator may be coupled to the power converter interface circuit and configured to cause the power converter interface circuit to generate an emulated dimmer output voltage. The emulated dimmer output voltage may emulate part of a cycle of a non-zero alternating current dimmer output voltage of the dimmer after a triac of the dimmer prematurely stops conducting that would occur if the triac continued conducting during the part of the cycle. The dimmer output voltage emulator may include a pull-down circuit to pull-down current of the power converter interface circuit and generally decrease the emulated dimmer output voltage during a first period of time and a hold circuit to maintain the emulated dimmer output voltage below a substantially non-zero threshold value during a second period of time. The power converter may be coupled to the dimmer output voltage emulator. The controller may be coupled to the dimmer output voltage emulator and the power converter, wherein the controller is configured to control the power converter in accordance with the emulated dimmer output voltage.

Technical advantages of the present disclosure may be readily apparent to one of ordinary skill in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 3:
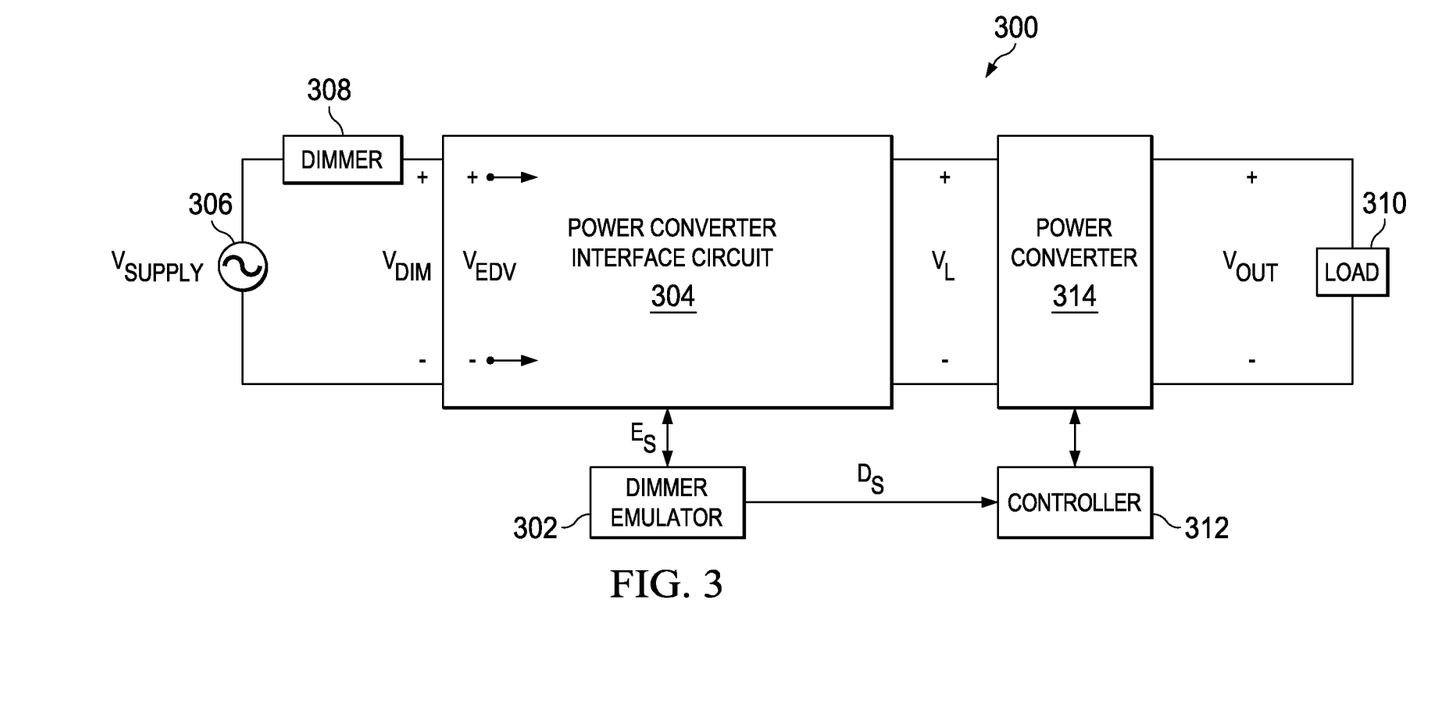
FIG. 3 illustrates an example lighting system having a dimmer output voltage emulator, in accordance with embodiments of the present disclosure.

FIG. 3 illustrates an example lighting system 300 having a dimmer output voltage emulator 302, in accordance with embodiments of the present disclosure. Voltage supply 306 may generate a supply voltage $V_{SUPPLY}$, which in some embodiments may be identical or similar to the supply voltage generated by voltage supply 104 of FIG. 1. Dimmer 308 may generate a dimmer voltage $V_{DIM}$ and may provide dimmer voltage $V_{DIM}$ to power converter interface circuit 304. In some embodiments, dimmer 308 may be identical or similar to triac-based dimmer 102 of FIG. 1. Dimmer emulator 302 may sense dimmer voltage $V_{DIM}$ and generate an emulator signal $E_S$ that causes the power converter interface circuit 304 to generate an emulated dimmer output voltage $V_{EDV}$. Emulated dimmer output voltage $V_{EDV}$ may effectively function as a dimmer output voltage. Power converter interface circuit 304 may convert the emulated dimmer output voltage $V_{EDV}$ into a link voltage $V_L$ to power converter 314.

Dimmer emulator 302 may also provide a dimmer information signal $D_S$ to controller 312. Dimmer information signal $D_S$ may indicate how much energy power converter 314 should provide to load 310. For example, if dimmer signal $V_{DIM}$ indicates a 50% dimming level, then dimmer information signal $D_S$ may indicate a 50% dimming level. Controller 312 may respond to the dimmer information signal $D_S$ and cause power converter 314 to provide 50% power to load 310. The particular generation of emulator signal $E_S$ and dimmer information signal $D_S$ are matters of design choice and, for example, depend on the particular respective designs of power converter interface circuit 304 and controller 312. In some embodiments, dimmer emulator 302 may include an analog-to-digital converter to convert the dimmer signal $V_{DIM}$ into a digital dimmer information signal $D_S$. In these and other embodiments, dimmer emulator 302 may include a timer that determines the phase delay of the dimmer signal $V_{DIM}$ and may convert the phase delay into dimmer information signal $D_S$. In these and other embodiments, emulator signal $E_S$ may be a current that controls the emulated dimmer output voltage $V_{EDV}$. In some embodiments, emulator signal $E_S$ and dimmer signal information signal $D_S$ may be two different signals. In other embodiments, emulator signal $E_S$ and dimmer information signal $D_S$ may be the same signal.

Load 310 may comprise any type of load. In at least one embodiment, load 310 may include one or more lamps, such as one or more light emitting diodes (LEDs). The particular type and design of controller 312 is a matter of design choice. An example of a controller 312 may be any controller available from Cirrus Logic, Inc. having offices in Austin, Tex., USA. The particular type and design of power converter 314 is a matter of design choice. In some embodiments, power converter 314 may be a switching power converter, such as a boost-type, buck-type, boost-buck-type, or Cuk-type switching power converter. In these and other embodiments, power converter 314 provides power factor correction and regulates output voltage $V_{OUT}$ and/or current delivered to load 310. For example, U.S. Pat. No. 7,719,246, entitled "Power Control System Using a Nonlinear Delta-Sigma Modulator with Nonlinear Power Conversion Process Modeling", filed Dec. 31, 2007, with inventor John L. Melanson describes example power converters and controllers that may be used in connection with this disclosure.

Figure 4:
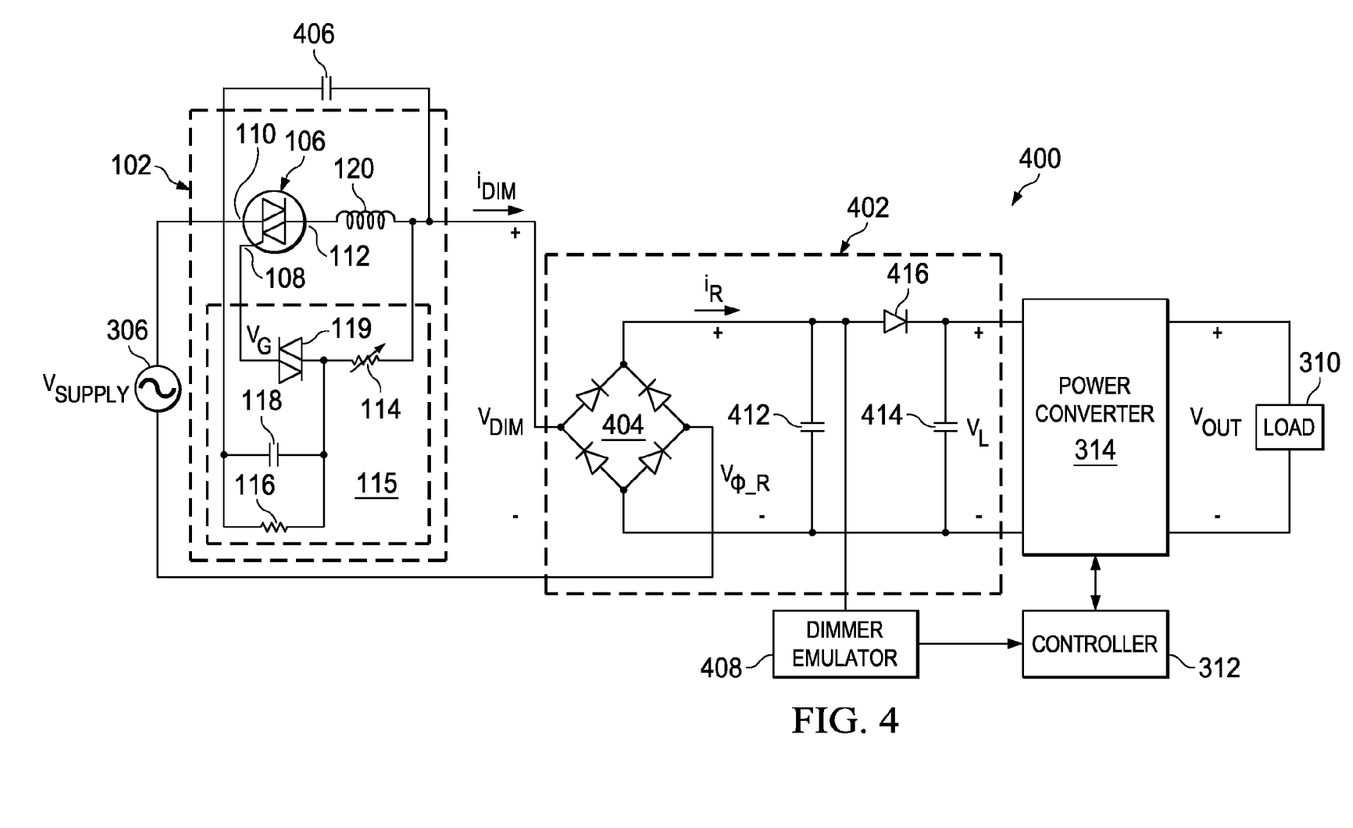
FIG. 4 illustrates an example lighting system similar to that of FIG. 3 with selected components of an example dimmer and example power converter interface circuit, in accordance with embodiments of the present disclosure.
Figure 5:
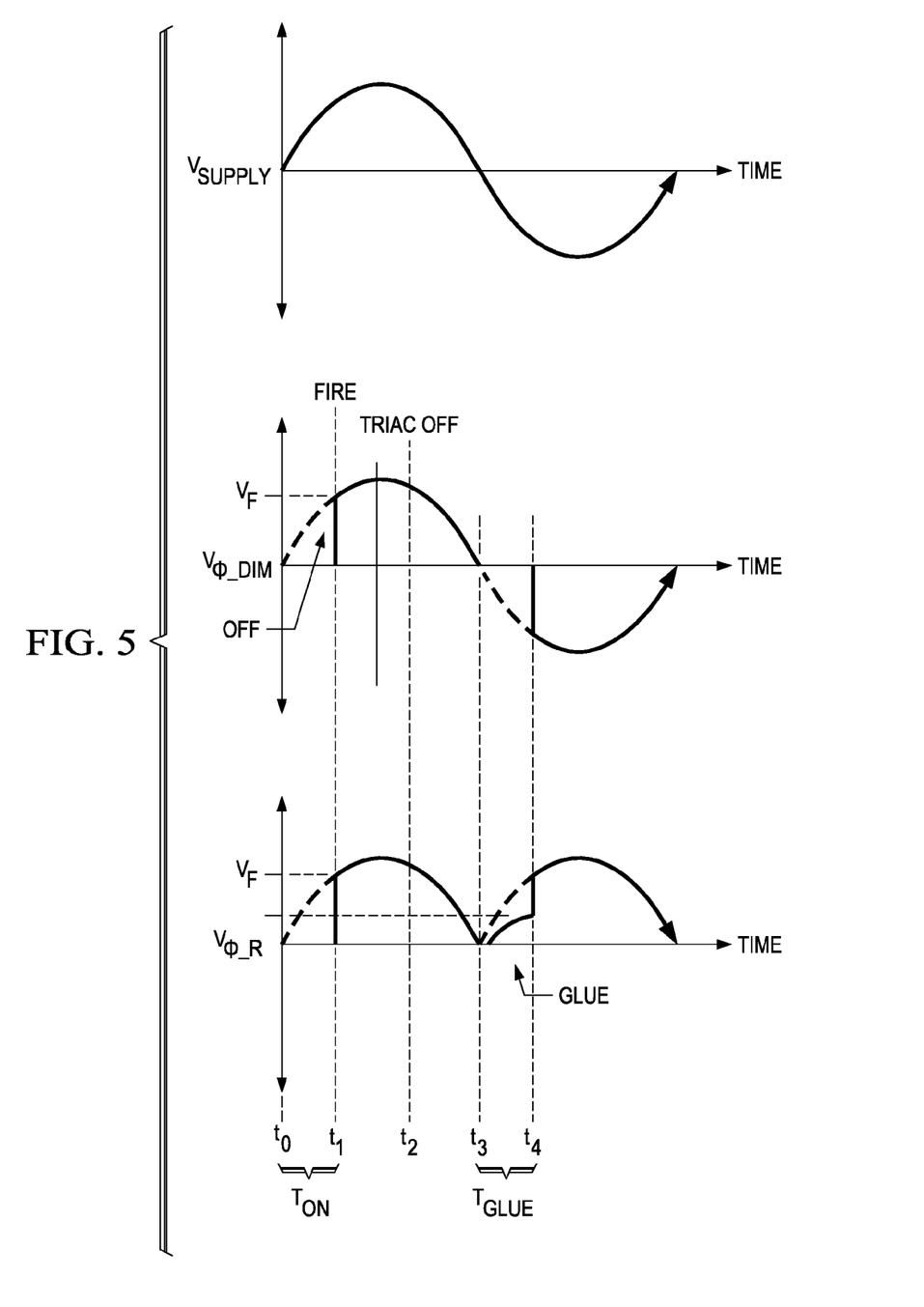
FIG. 5 illustrates example voltage graphs associated with the lighting system of FIG. 4, in accordance with embodiments of the present disclosure.

FIG. 4 illustrates an example lighting system 400 similar to that of FIG. 3 with selected components of example dimmer 102 and example power converter interface circuit 402, in accordance with embodiments of the present disclosure. FIG. 5 illustrates example voltage graphs associated with the lighting system 400, in accordance with embodiments of the present disclosure. Voltage supply 306 may provide a supply voltage $V_{SUPPLY}$, and triac-based dimmer 102 may generate a dimmer voltage $V_{\phi\_DIM}$ as described in conjunction with FIG. 1. In the embodiments represented by FIG. 5, triac 106 may turn ON at time $t_1$ when the supply voltage $V_{SUPPLY}$ is at 45° and 225°. Power converter interface circuit 402, which represents an example power converter interface 304, may include a full-bridge diode rectifier 404 that rectifies dimmer voltage $V_{\phi\_DIM}$ to generate voltage $V_{\phi\_R}$, while the triac 106 is ON between times $t_1$ and $t_2$. The voltage $V_{\phi\_R}$ may recharge capacitor 414. In some embodiments, load 310 presents a low wattage load to power interface circuit 402. For example, in some embodiments, load 310 may include one or more low wattage lamps, such as 5- to 10-watt light emitting diodes ("LEDs"). In this embodiment, load 310 may draw a relatively small amount of current which may cause the dimmer current $i_{DIM}$ to drop below the holding current value HC at time $t_2$. Thus, as shown in FIG. 5, current $i_{DIM}$ may fall below the holding current value HC, and triac 106 may turn OFF prematurely at time $t_2$. Conventionally, when triac 106 turns OFF at time $t_2$, triac 106 would chop the trailing edge of rectified voltage $V_{\phi\_R}$ at time $t_2$. However, dimmer emulator 408, which represents one embodiment of dimmer emulator 302, may cause power converter interface circuit 402 to emulate a continuous rectified voltage $V_{\phi\_R}$.

When triac 106 turns OFF, capacitor 406 may maintain the voltage across triac 106 and inductor 120 low so that very little current is drawn from the timing circuit 115 during time period $T_{ON}$. In some embodiments, the current drawn from the timing circuit 115 may be low enough to prevent triac 106 from firing prior to the next phase cut ending time at time $t_4$. Capacitor 406 may have a capacitance value of, for example, 100 nF.

In some embodiments, supply voltage $V_{SUPPLY}$ may comprise a sine wave. Thus, the ideal voltage $V_{\phi\_R}$ during the ON period $T_{ON}$ is a portion of a sine wave. Voltage $V_{\phi\_R}$ may charge capacitor 412. A current $i_R$ that is proportional to the derivative of the voltage $V_{\phi\_R}$ over time, i.e. $i_R \alpha\ dV_{\phi\_R}/dt$, and drawn from capacitor 412 may cause the voltage $V_{\phi\_R}$ across capacitor 412 to emulate the dimmer output voltage $V_{DIM}$ that would occur if the dimmer current $i_{DIM}$ remained above the holding current value HC. Thus, when triac 106 turns OFF, the voltage $V_{\phi\_R}$ may become an emulated dimmer output voltage (e.g., an emulated dimmer output voltage $V_{EDV}$ of FIG. 3). Accordingly, in some embodiments, dimmer emulator 408 may generate a current $i_R$ to cause power converter interface circuit 402 to generate voltage $V_{\phi\_R}$ as the emulated dimmer output voltage $V_{EDV}$. When dimmer emulator 408 generates a current $i_R$ to cause power converter interface circuit 402 to generate voltage $V_{\phi\_R}$, voltage $V_{\phi\_R}$ may be referred to as the "emulated dimmer output voltage $V_{\phi\_R}$."

When the triac 106 is turned ON, current $i_R$ may charge link capacitor 414 through diode 416 as long as the voltage $V_{\phi\_R}$ exceeds the link voltage $V_L$ by at least the forward-biased voltage (e.g., 0.7V) of diode 416. In some embodiments, link capacitor 414 may have a large enough capacitance to provide an approximately constant link voltage $V_L$ to power converter 314. In some embodiments, the capacitance of capacitor 412 is 10 nF, and the capacitance of link capacitor 414 is 1.5 µF.

As the voltage $V_{\phi\_R}$ decreases, the current $i_{DIM}$ may decrease below the holding current value HC at time $t_2$, and triac 106 may turn OFF at time $t_2$. Dimmer emulator 408 may then discharge capacitor 412 by drawing current $i_R$ from capacitor 412. During the time between $t_2$ and $t_3$, dimmer emulator 408 may draw current $i_R$ in proportion to $dV_{\phi\_R}/dt$ so that the emulated dimmer output voltage $V_{\phi\_R}$ emulates a decreasing sine wave. As the voltage $V_{\phi\_R}$ approaches zero volts at time $t_3$, the dimmer emulator 408 may draw sufficient current $i_R$ from capacitor 412 to hold the voltage $V_{\phi\_R}$ below a threshold voltage $V_{GLUE}$, until the triac 106 turns ON again at time $t_4$. Holding the voltage $V_{\phi\_R}$ low during the OFF period $T_{GLUE}$ allows the timing circuitry 115 to reset and turn triac 106 ON at time $t_4$ during the next half cycle of the supply voltage $V_{SUPPLY}$.

Dimmer emulator 408 can be implemented in any of a variety of ways. For example, U.S. Pat. No. 8,569,972, entitled "Dimmer Output Emulation", filed Aug. 17, 2010, with inventor John L. Melanson describes example dimmer emulators that, if adapted consistent with this disclosure, may be used in connection with embodiments of this disclosure.

Figure 6:
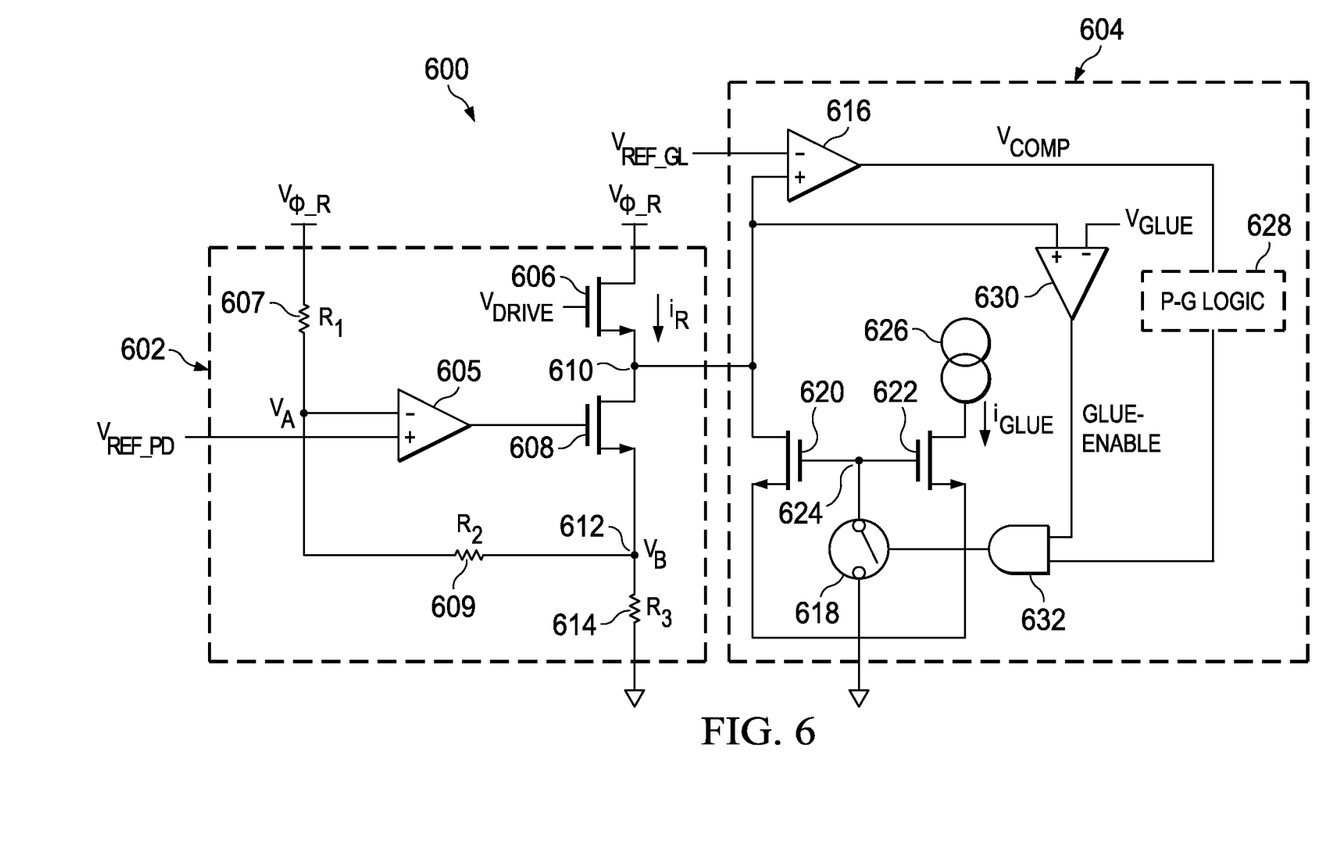
FIG. 6 illustrates an example dimmer emulator, in accordance with embodiments of the present disclosure.

FIG. 6 illustrates an example dimmer emulator 600, in accordance with embodiments of the present disclosure. Dimmer emulator 600 may be used in embodiments of dimmer emulator 302 and/or dimmer emulator 408. Dimmer emulator 600 represents embodiments of a current source that controls current $i_R$. Dimmer emulator 600 includes a pull-down circuit 602 to pull-down current $i_R$ after triac 106 turns OFF, and a hold or "glue" circuit 604 to hold the emulated dimmer output voltage $V_{\phi\_R}$ to below a threshold voltage $V_{GLUE}$ until the triac 106 fires in a next half-cycle of dimmer voltage $V_{DIM}$.

Figure 7:
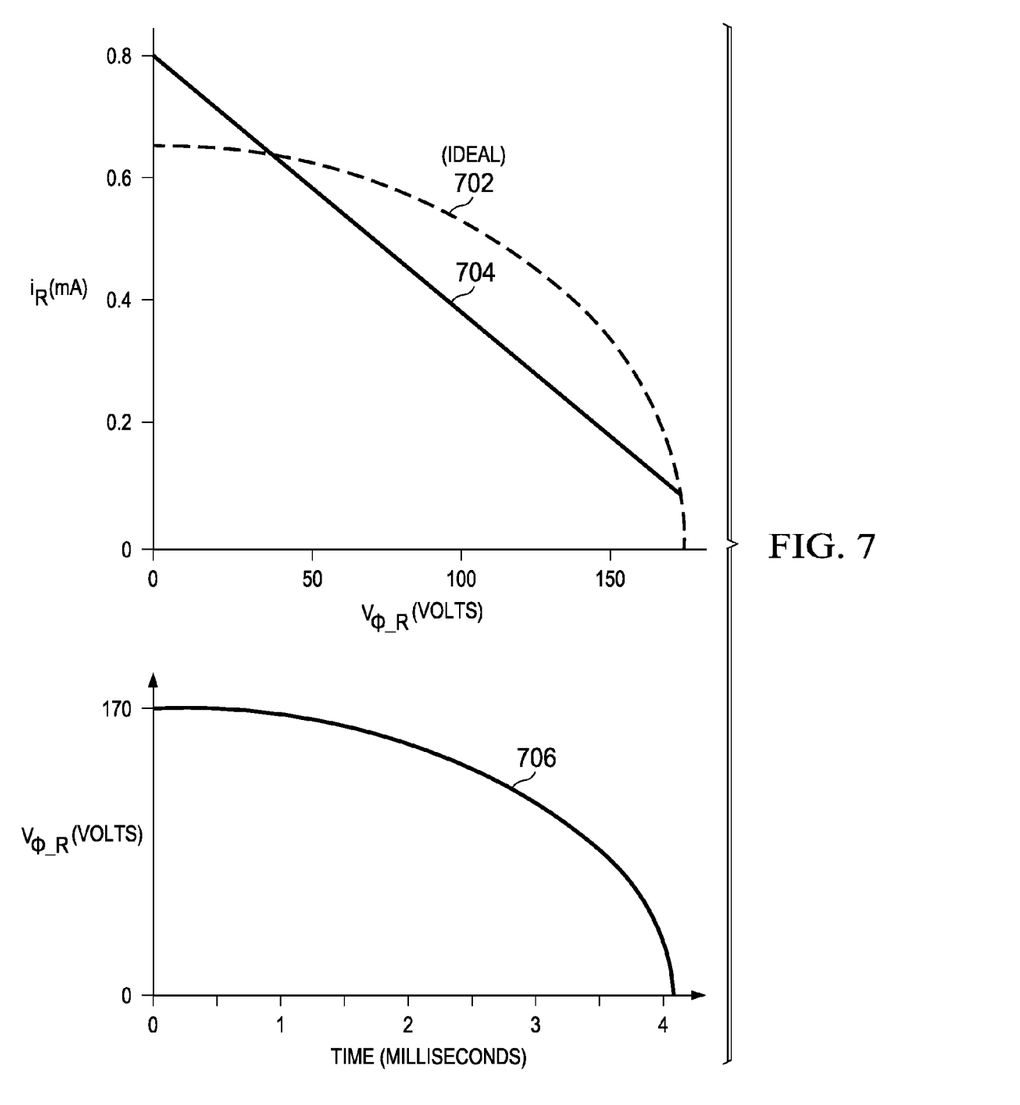
FIG. 7 illustrates example voltage and current graphs involving an emulated dimmer output voltage which is caused by an embodiment of a pull-down circuit, in accordance with embodiments of the present disclosure.

FIG. 7 illustrates example voltage and current graphs involving an emulated dimmer output voltage $V_{\phi\_R}$ which is caused by an embodiment of pull-down circuit 602, in accordance with embodiments of the present disclosure. Referring to FIGS. 6 and 7, because supply voltage $V_{SUPPLY}$ is a cosine wave, and current $i_R$ is directly related to the derivative of emulated dimmer output voltage $V_{\phi\_R}$, the ideal relationship between current $i_R$ and emulated dimmer output voltage $V_{\phi\_R}$ for a half cycle of supply voltage $V_{SUPPLY}$ is a quarter sine wave 702. However, a linearly decreasing relationship 704 between current $i_R$ and emulated dimmer output voltage $V_{\phi\_R}$ is a close approximation of the ideal waveform 702. The $i_R$ versus emulated dimmer output voltage $V_{\phi\_R}$ relationship 704 may cause power converter interface circuit 402 to generate an oval emulated dimmer output voltage $V_{\phi\_R}$ versus time graph 706, which is a close approximation to a phase cut supply voltage $V_{SUPPLY}$.

In general, pull-down circuit 602 may create a linearly decreasing relationship 704 between current $i_R$ and emulated dimmer output voltage $V_{\phi\_R}$. Pull-down circuit 602 may include an operational amplifier 605 which includes a non-inverting input terminal "+" to receive a pull-down reference voltage $V_{REF\_PD}$. A feedback loop with voltage divider R1 and R2 between the emulated dimmer output voltage $V_{\phi\_R}$ terminal 605 and voltage $V_B$ at node 612 creates an inverse relationship between voltage $V_B$ and emulated dimmer output voltage $V_{\phi\_R}$. Thus, as the emulated dimmer output voltage $V_{\phi\_R}$ decreases, operational amplifier 605 drives the gate of n-channel metal oxide semiconductor field effect transistor (NMOSFET) 608 to increase the voltage $V_B$ so that the voltage $V_A$ at the inverting terminal "–" matches the reference voltage $V_{REF\_PD}$ at the non-inverting terminal "+". Similarly, as emulated dimmer output voltage $V_{\phi\_R}$ increases, operational amplifier 605 drives the gate of NMOSFET 608 to decrease voltage $V_B$ so that the voltage $V_A$ at the inverting terminal "–" continues to match the reference voltage $V_{REF\_PD}$ at the non-inverting terminal "+".

The voltage $V_{DRIVE}$ at the gate of NMOSFET 606 maintains NMOSFET 606 in saturation mode. In some embodiments, voltage $V_{DRIVE}$ is +12V. Voltage $V_B$ across resistor 614 determines the value of current $i_R$ (i.e., $i_R = V_B/R_3$, where "$R_3$" is the resistance value of resistor 614). Thus, current $i_R$ varies directly with voltage $V_B$ and, thus, varies inversely with emulated dimmer output voltage $V_{\phi\_R}$ as depicted by the linearly decreasing $i_R$ versus $V_{\phi\_R}$ relationship 704. From the topology of pull-down circuit 602, voltage $V_B$ is related to the reference voltage $V_{REF\_PD}$ in accordance with the following equation:

$$V_B = V_{REF\_PD}(R_1+R_2)/R_1 - R_2 V_{\phi\_R}/R_1$$

Where $R_1$ is the resistance value of resistor 607, and $R_2$ is the resistance value of resistor 609. If $R_1 \gg R_2$, then the voltage $V_B$ may be represented by equation:

$$V_B \approx V_{REF\_PD} - R_2 V_{\phi\_R}/R_1$$

Because $i_R = V_B/R3$, if $R_1$ is 10 MΩ, $R_2$ is 42 kΩ, and $R_3$ is 1 kΩ, $i_R$ may be represented by the equation:

$$i_R \approx 0.8(1 - V_{\phi\_R}/190) \text{mA}$$

Once the pull-down circuit 602 lowers the emulated dimmer output voltage $V_{\phi\_R}$ to a glue down reference voltage $V_{REF\_GL}$, glue-down circuit 604 may hold the emulated dimmer output voltage $V_{\phi\_R}$ at or below a threshold voltage $V_{GLUE}$ until the triac 106 fires and raises the emulated dimmer output voltage $V_{\phi\_R}$. Comparator 616 of glue-down circuit 604 may compare emulated dimmer output voltage $V_{\phi\_R}$ with glue-down reference voltage $V_{REF\_GL}$. The particular value of the glue-down reference voltage $V_{REF\_GL}$ is a matter of design choice. In at least one embodiment, voltage $V_{REF\_GL}$ is set so that glue-down circuit 604 holds the voltage $V_{\phi\_R}$ at approximately threshold voltage $V_{GLUE}$ when the voltage $V_{\phi\_R}$ approaches 0V. For example, in some embodiments, glue-down reference voltage $V_{REF\_GL}$ may be set to 5V. In other embodiments, glue-down reference voltage $V_{REF\_GL}$ may be set to a higher voltage (e.g., 10V, 15V, 20V). Because NMOSFET 606 operates in saturation mode, the voltage at node 610 is approximately equal to emulated dimmer output voltage $V_{\phi\_R}$. When emulated dimmer output voltage $V_{\phi\_R}$ is greater than the glue-down reference voltage $V_{REF\_GL}$, the output voltage $V_{COMP}$ of comparator 616 is a logical 0. In some embodiments, the comparator output voltage $V_{COMP}$ may be passed directly as signal GLUE_ENABLE to an input of a logical AND gate 632.

In some embodiments, glue-down circuit 604 may also include pull-down, glue logic ("P-G logic") 628. The P-G logic 628 may generate the signal GLUE_ENABLE to control conductivity of switch 618. The particular function(s) of P-G logic 628 are a matter of design choice. For example, in some embodiments, P-G logic 628 may enable and disable glue-down circuit 604. In such embodiments, to enable and disable glue-down circuit 604, P-G logic 628 may determine whether the dimmer output voltage $V_{\phi\_DIM}$ contains any phase cuts. If the dimmer output voltage $V_{\phi\_DIM}$ does not indicate any phase cuts, then the P-G logic 628 may disable the glue-down circuit 604 by generating the GLUE_ENABLE signal with a value of logical 0 such that the output and logical AND gate is a logical 0 and switch 618 does not conduct regardless of the value of comparator output voltage $V_{COMP}$. In some embodiments, P-G logic 628 may include a timer that may determine how often the comparator output voltage $V_{COMP}$ changes logical state. If the time between logical state changes is consistent with no phase cuts, P-G logic 628 may disable glue-down circuit 604.

Comparator 630 of glue-down circuit 604 may compare emulated dimmer output voltage $V_{\phi\_R}$ (e.g., at node 610) with a threshold voltage $V_{GLUE}$. The particular value of threshold voltage $V_{GLUE}$ is a matter of design choice. In embodiments in which threshold voltage $V_{GLUE}$ is approximately 0 V, or in embodiments of glue-down circuit 604 in which comparator 630 and AND gate 632 are not present (thus allowing the GLUE_ENABLE signal to pass directly to switch 618), a low impedance of a power converter interface circuit (e.g., power converter interface circuit 304, power converter interface circuit 402) may be presented to a dimmer (e.g., dimmer 308, dimmer 102), which may lead to a small average direct current in a load (e.g., load 310), which may cause flicker, may cause other elements of a lighting system (e.g., a transformer) to overheat, or may cause other undesirable effects, especially when many loads (e.g., low-power lamps) are coupled to the dimmer. Accordingly, in some embodiments of the present disclosure, threshold voltage $V_{GLUE}$ may be set to a substantially non-zero voltage (e.g., 2V, 5V, 10V). When emulated dimmer output voltage $V_{\phi\_R}$ exceeds threshold voltage $V_{GLUE}$, the output of comparator 630 may have a value of logical 1, otherwise the output of comparator 630 may have a value of logical 0.

Logical AND gate 632 may perform a logical AND of the GLUE_ENABLE signal and the signal output by comparator 630, such that the output of logical AND gate 632 is a logical 1 when the output of comparator 630 and the GLUE_ENABLE signal are both logical 1, and the output of logical AND gate 632 is a logical 0 otherwise. The output of logical AND gate 632 may be communicated to a control terminal of switch 618. Switch 618 may be any type of switch and is, for example, an NMOSFET. When the logical AND gate 632 output voltage is a logical 0, switch 618 may be OFF, and NMOSFETs 620 and 622 may also be also OFF. When the logical AND gate 632 output voltage is a logical 1, NMOSFETs 620 and 622 may conduct. NMOSFETs 620 and 622 are configured as a current mirror sharing a common gate terminal 624. A current source 626 may generate a glue current $i_{GLUE}$, which is mirrored through NMOSFET 620. In some embodiments, when emulated dimmer output voltage $V_{\phi\_R}$ is less than glue-down reference voltage $V_{REF\_GL}$ and emulated dimmer output voltage $V_{\phi\_R}$ is greater than threshold voltage $V_{GLUE}$, current $i_R$ may be approximately equal to glue current $i_{GLUE}$. The glue current $i_{GLUE}$ may set to a value large enough to hold the emulated dimmer output voltage $V_{\phi\_R}$ at or below threshold voltage $V_{GLUE}$ until triac 106 of FIG. 4 fires again. In some embodiments, glue current $i_{GLUE}$ may be at least as large as the holding current value HC of dimmer 102 of FIG. 4, such as 250 mA. Thus, glue-down circuit 604 draws a steady-state glue current $i_{GLUE}$ from the power converter interface circuit 402 to maintain the emulated dimmer output voltage $V_{\phi\_R}$ at or below threshold voltage $V_{GLUE}$, during a period of time (e.g., at least the period $T_{GLUE}$ shown in FIG. 5) from when the pull-down circuit 602 lowers the emulated dimmer output voltage $V_{\phi\_R}$ to the glue down reference voltage $V_{REF\_GL}$ until the triac 106 fires and raises the emulated dimmer output voltage $V_{\phi\_R}$. In addition, as shown in FIG. 5, after emulated dimmer output voltage $V_{\phi\_R}$ reaches zero volts at the end of a half-phase of emulated dimmer output voltage $V_{\phi\_R}$, glue-down circuit 604 may enable emulated dimmer output voltage $V_{\phi\_R}$ to rise to the threshold voltage $V_{GLUE}$, prior to glue-down circuit 604 drawing a steady-state glue current $i_{GLUE}$ from the power converter interface circuit 402 to maintain the emulated dimmer output voltage $V_{\phi\_R}$ at or below threshold voltage $V_{GLUE}$.

As used herein, when two or more elements are referred to as "coupled" to one another, such term indicates that such two or more elements are in electronic communication whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. An apparatus comprising:
   a dimmer output voltage emulator configured to cause a power converter interface circuit to draw current from a capacitor in the power converter interface during a period of time when a dimmer coupled to the power converter interface circuit is non-conducting to generate an emulated dimmer output voltage, wherein:
   the emulated dimmer output voltage emulates part of a cycle of a non-zero alternating current dimmer output voltage of the dimmer after a triac of the dimmer prematurely stops conducting that would occur if the triac continued conducting during the part of the cycle; and
   the dimmer output voltage emulator comprises a pull-down circuit to pull-down current of the power converter interface circuit and generally decrease the emulated dimmer output voltage during a first period of time and a hold circuit to maintain the emulated dimmer output voltage below a substantially non-zero threshold value during a second period of time.

2. The apparatus of claim 1, wherein the hold circuit provides a steady state current draw from the power converter interface circuit during the second period of time.

3. The apparatus of claim 1, wherein the first period of time begins when a triac of a triac-based dimmer circuit ceases conducting during a cycle of an AC supply voltage, the second period of time begins when the supply voltage is below a second threshold voltage, the first period ends when the second period begins, and the second period ends when the supply voltage begins to increase.

4. The apparatus of claim 3, wherein the second threshold voltage is approximately zero.

5. The apparatus of claim 1, wherein the dimmer is a trailing-edge dimmer.

6. A method comprising:
causing a power converter interface circuit to draw current from a capacitor in the power converter interface during a period of time when a dimmer coupled to the power converter interface circuit is non-conducting to generate an emulated dimmer output voltage, wherein generating the emulated dimmer output voltage comprises:
emulating part of a cycle of a non-zero alternating current dimmer output voltage of the dimmer after a triac of the dimmer prematurely stops conducting that would occur if the triac continued conducting during the part of the cycle; and
pulling down current of the power converter interface circuit and generally decreasing the emulated dimmer output voltage during a first period of time and maintaining the emulated dimmer output voltage below a substantially non-zero threshold value during a second period of time.

7. The method of claim 6, wherein maintaining the emulated dimmer output voltage below the substantially non-zero threshold value during the second period of time comprises providing a steady state current draw from the power converter interface circuit during the second period of time.

8. The method of claim 6, wherein the first period of time begins when a triac of a triac-based dimmer circuit ceases conducting during a cycle of an AC supply voltage, the second period of time begins when the supply voltage is below a second threshold voltage, the first period ends when the second period begins, and the second period ends when the supply voltage begins to increase.

9. The apparatus of claim 8, wherein the second threshold voltage is approximately zero.

10. The apparatus of claim 6, wherein the dimmer is a triac-based dimmer.

11. An apparatus comprising:
a power converter interface circuit configured to couple to a dimmer;
a dimmer output voltage emulator coupled to the power converter interface circuit and configured to cause the power converter interface circuit to generate an emulated dimmer output voltage, wherein:
the emulated dimmer output voltage emulates part of a cycle of a non-zero alternating current dimmer output voltage of the dimmer after a triac of the dimmer prematurely stops conducting that would occur if the triac continued conducting during the part of the cycle; and
the dimmer output voltage emulator comprises a pull-down circuit to pull-down current of the power converter interface circuit and generally decrease the emulated dimmer output voltage during a first period of time and a hold circuit to maintain the emulated dimmer output voltage below a substantially non-zero threshold value during a second period of time;
a power converter coupled to the dimmer output voltage emulator; and
a controller coupled to the dimmer output voltage emulator and the power converter, wherein the controller is configured to control the power converter in accordance with the emulated dimmer output voltage.

12. The apparatus of claim 11, wherein the hold circuit provides a steady state current draw from the power converter interface circuit during the second period of time.

13. The apparatus of claim 11, wherein the first period of time begins when a triac of a triac-based dimmer circuit ceases conducting during a cycle of an AC supply voltage, the second period of time begins when the supply voltage is below a second threshold voltage, the first period ends when the second period begins, and the second period ends when the supply voltage begins to increase.

14. The apparatus of claim 13, wherein the second threshold voltage is approximately zero.

15. The apparatus of claim 11, wherein the dimmer is a trailing-edge dimmer.

16. The apparatus of claim 11, wherein the power converter is a switching power converter.

17. The apparatus of claim 11, further comprising a lamp coupled to the power converter.

18. The apparatus of claim 17, wherein the lamp comprises a light-emitting diode lamp.

19. The apparatus of claim 11, wherein the apparatus comprises a lamp assembly configured to house a lamp.

20. The apparatus of claim 19, wherein the lamp assembly comprises a multifaceted reflector form factor.

* * * * *